(12) United States Patent
Currivan et al.

(10) Patent No.: US 8,948,316 B2
(45) Date of Patent: Feb. 3, 2015

(54) UPSTREAM FREQUENCY RESPONSE MEASUREMENT AND CHARACTERIZATION

(75) Inventors: Bruce J. Currivan, Los Altos, CA (US);
Thomas J. Kolze, Phoenix, AZ (US);
Jonathan S. Min, Fullerton, CA (US);
Victor T. Hou, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 323 days.

(21) Appl. No.: 13/428,309

(22) Filed: Mar. 23, 2012

(65) Prior Publication Data
US 2012/0243597 A1 Sep. 27, 2012

Related U.S. Application Data

(60) Provisional application No. 61/467,659, filed on Mar. 25, 2011.

(51) Int. Cl.
*H04L 27/06* (2006.01)
*H04J 11/00* (2006.01)
*H04L 25/02* (2006.01)
*H04L 25/03* (2006.01)

(52) U.S. Cl.
CPC ......... *H04L 25/022* (2013.01); *H04L 25/03006* (2013.01)

USPC .......................................... 375/340; 370/208

(58) Field of Classification Search
USPC ..................... 375/316, 340, 229; 370/208; 708/403–405
See application file for complete search history.

(56) References Cited

U.S. PATENT DOCUMENTS

2003/0081695 A1* 5/2003 Eilts et al. ...................... 375/316
2004/0004933 A1* 1/2004 Zhu et al. ....................... 370/203

\* cited by examiner

*Primary Examiner* — Vineeta Panwalkar
(74) *Attorney, Agent, or Firm* — Garlick & Markison; Shayne X. Short

(57) ABSTRACT

Upstream frequency response measurement and characterization. Signaling is provided between respective communication devices within a communication system. Based upon at least one of these signals, one of the communication devices captures a number of sample sets corresponding thereto at different respective frequencies (e.g., a different respective center frequencies, frequency bands, etc.). Then, spectral analysis is performed with respect to each of the sample sets to generate a respective and corresponding channel response estimate there from. After this number of channel response estimates is determined, they are combined or splice together to generate a full channel response estimate. In implementations including an equalizer, different respective sample sets may correspond to those that have undergone equalization processing and those that have not.

20 Claims, 12 Drawing Sheets

• respective CH response estimates and full CH response estimate

US 8,948,316 B2

UPSTREAM FREQUENCY RESPONSE MEASUREMENT AND CHARACTERIZATION

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/467,659, entitled "Upstream frequency response measurement and characterization," filed Mar. 25, 2011, pending.

BACKGROUND OF THE INVENTION

1. Technical Field of the Invention

The invention relates generally to communication systems; and, more particularly, it relates to frequency response measurement and/or characterization of communication channels within such communication systems.

2. Description of Related Art

Data communication systems have been under continual development for many years. With such a communication system, characterization and/or estimation of any of a number of different parameters may be performed. For example, the communication channels are communication links over which signals traverse between communication devices may be analyzed for any of a number of reasons. For example, certain communication devices may perform appropriate processing of signals transmitted there from or received thereby based upon such characterization to improve the overall operation not only of those respective communication devices but the overall communication system. While the need to perform such characterization and/or estimation of various parameters within communication systems is well known, the prior art nonetheless continues to provide less than ideal solutions by which this may be made. As such, there continues to be a need to make such characterization and/or estimation of various parameters within communication systems in a better, more accurate, and more efficient way.

DETAILED DESCRIPTION OF THE INVENTION

Figure 1:
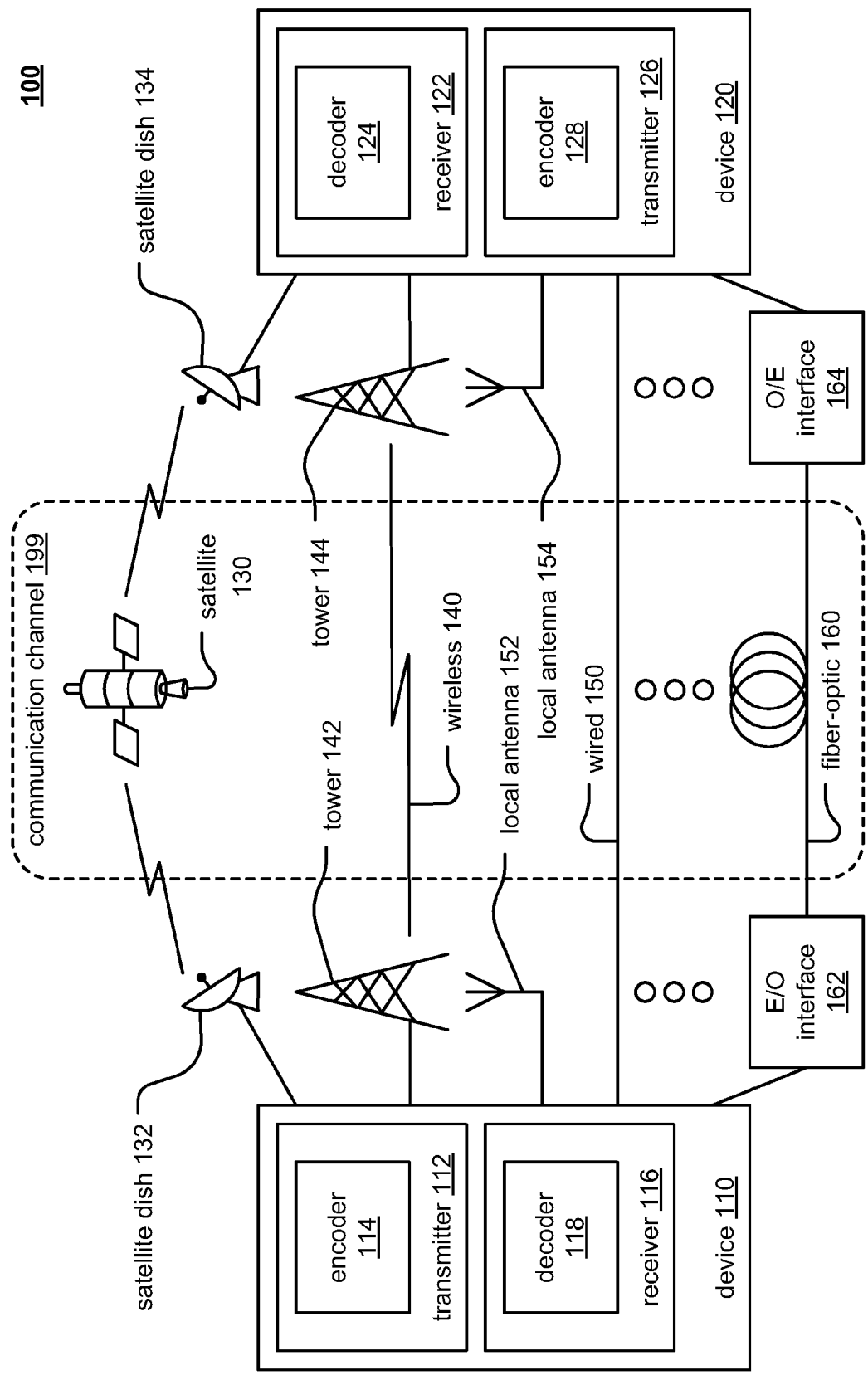
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
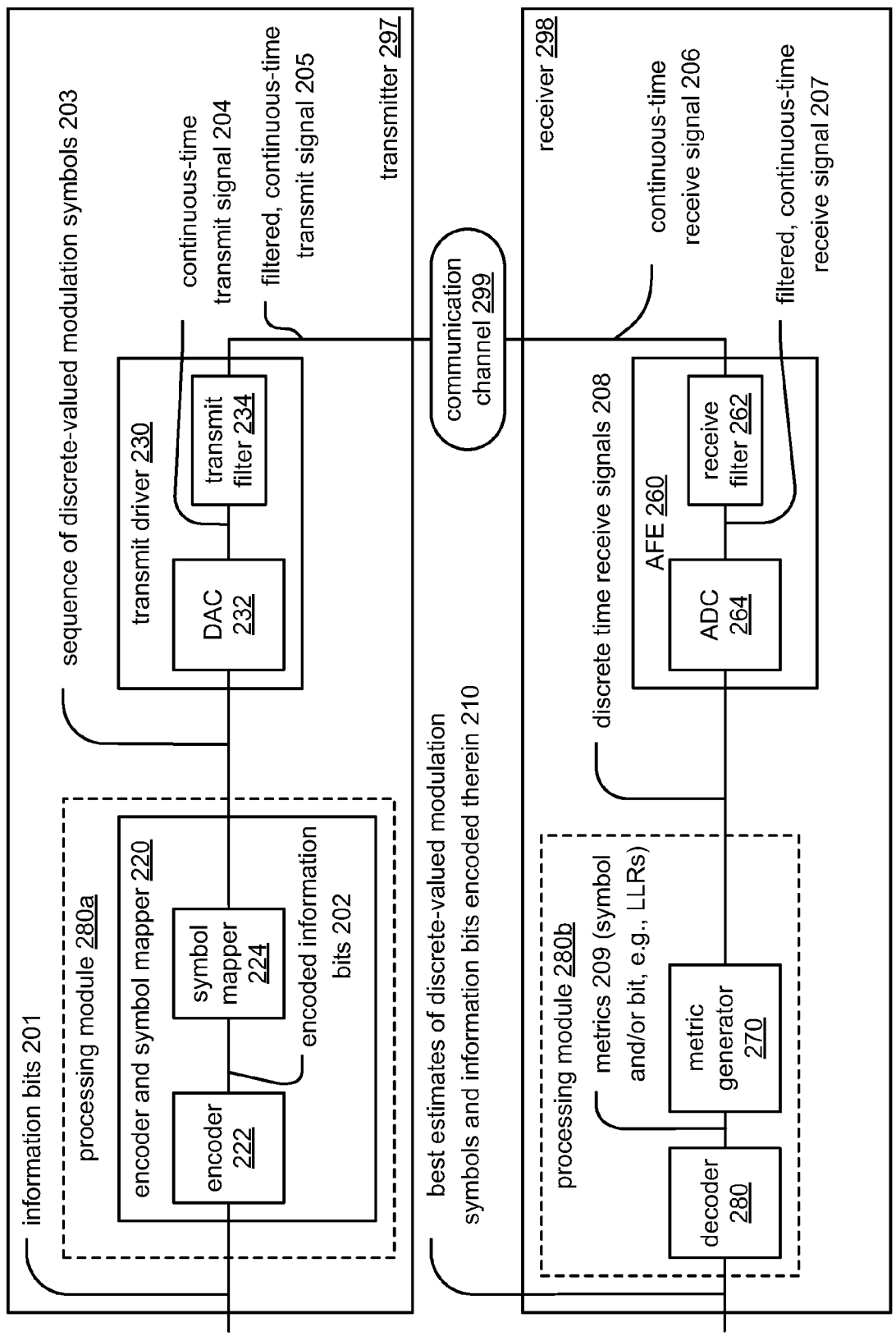

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
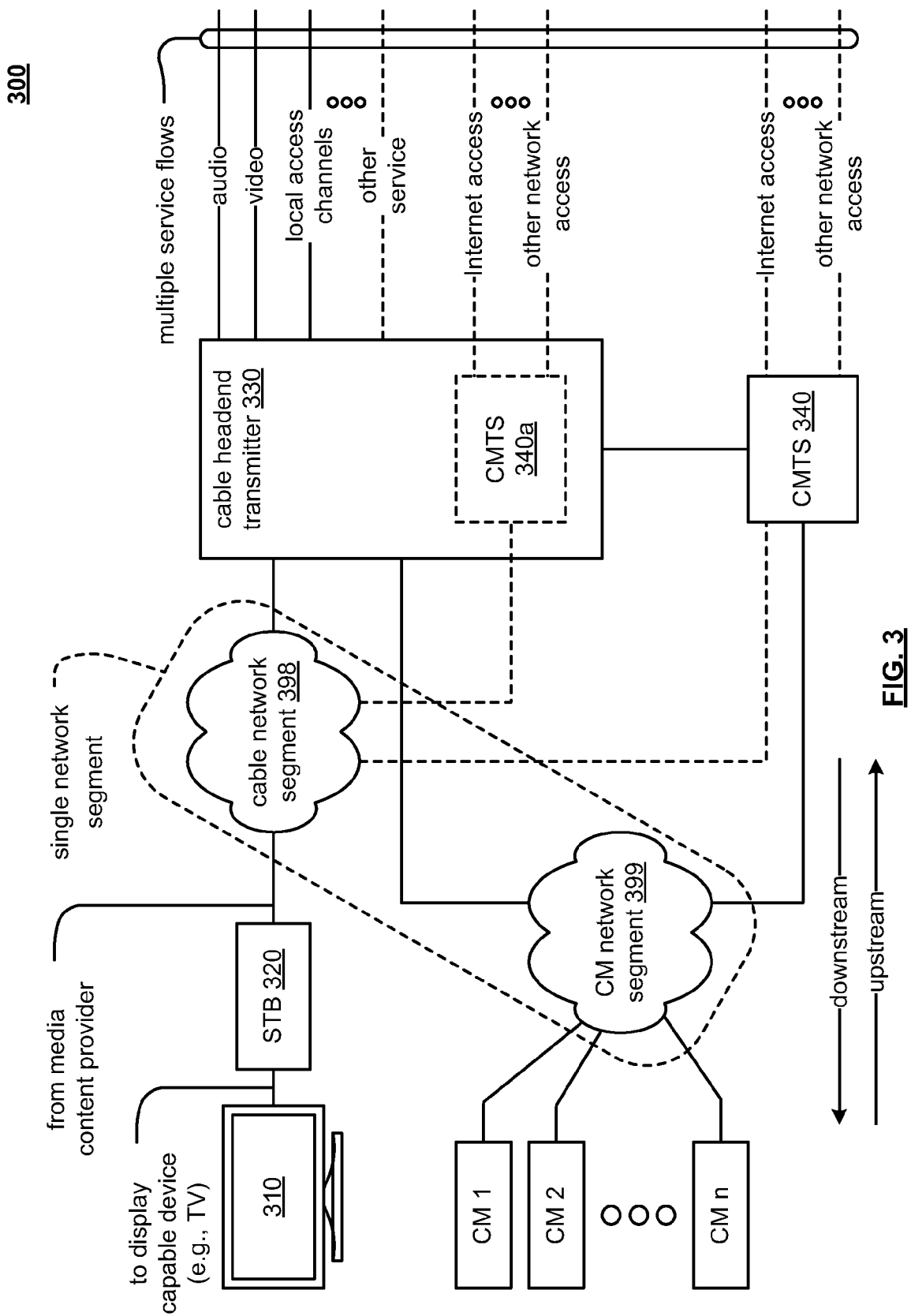

Referring to the communication system 300 of FIG. 3, this communication system 300 may be viewed particularly as being a cable system. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's headend, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the headend, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340a may also be coupled to the cable network segment 398, as the STB 320 may itself include cable modem functionality therein.

It is also noted that any one of the cable modems 1, 2, ... m n, the cable headend transmitter 330, the CMTS 340 or 340a, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Figure 4:
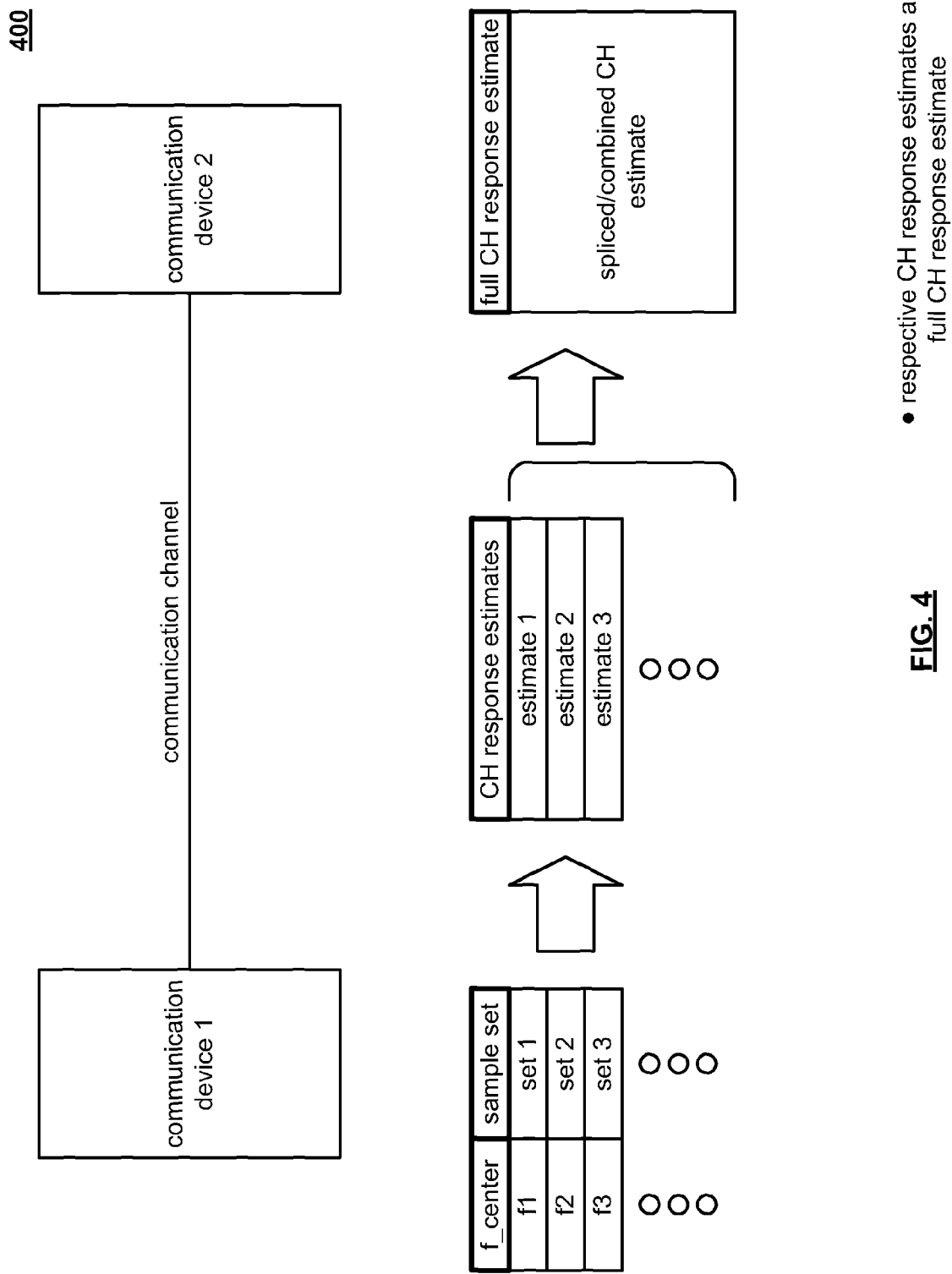
FIG. 4 illustrates an embodiment of communications between respective communication devices in a communication system, and respective channel response estimates made with respect to different respective center frequencies and/or frequency bands.

FIG. 4 illustrates an embodiment 400 of communications between respective communication devices in a communication system, and respective channel response estimates made with respect to different respective center frequencies and/or frequency bands. Generally speaking, this diagram shows communication between two respective communication devices within the communication system.

After a first communication device receives a signal (e.g., a ranging burst) from another communication device (e.g., a second communication device), the first communication device may be implemented to perform capture of a number of sample sets corresponding to the ranging burst. Each of these respective ranging bursts may correspond to a respective frequency and/or frequency band. Spectral analysis of each of these respective sample sets may be performed to generate a number of upstream channel response estimates such that each respective upstream channel response estimate thereof corresponds to one of the sample sets. These respective upstream channel response estimates may be spliced or combined together to generate a full upstream channel response estimate.

FIG. 5, FIG. 6, FIG. 7, and FIG. 8 illustrates various respective embodiments of respective channel response estimates at different respective center frequencies and/or frequency bands, and their relationship to a full channel response estimate.

Various of these respective diagrams show alternative in various embodiments by which respective channel response estimates may be made with respect to different respective frequencies or frequency bands.

Figure 5:
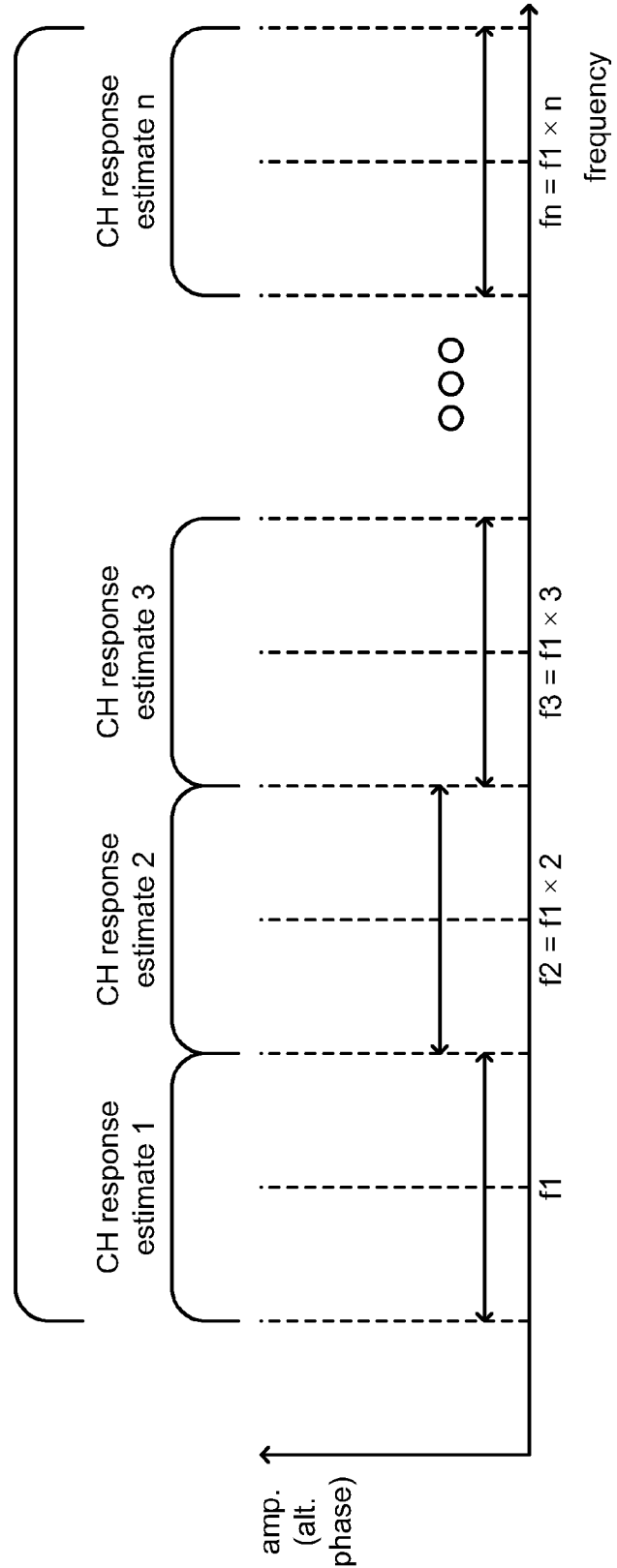
FIG. 5, FIG. 6, FIG. 7, and FIG. 8 illustrates various respective embodiments of respective channel response estimates at different respective center frequencies and/or frequency bands, and their relationship to a full channel response estimate.

Referring to the embodiment 500 of FIG. 5, as may be seen with respect to this diagram, a number of respective frequency bands are implemented with respect to a first frequency, f1. Each of the respective center frequencies of the higher frequency bands is shown as being a respective integer multiple of the first frequency. In accordance with this particular diagram, different respective channel response estimates are generated for each of the respective bands, and those channel response estimates are spliced or combined together to generate a full channel response estimate. As may be understood, such a full channel response estimate is a wideband channel response estimate. In addition, with respect to this diagram, each of the respective frequency bands extends directly up to a band edge, with no overlap into adjacent bands and with no guard interval in between the respective bands.

Figure 6:
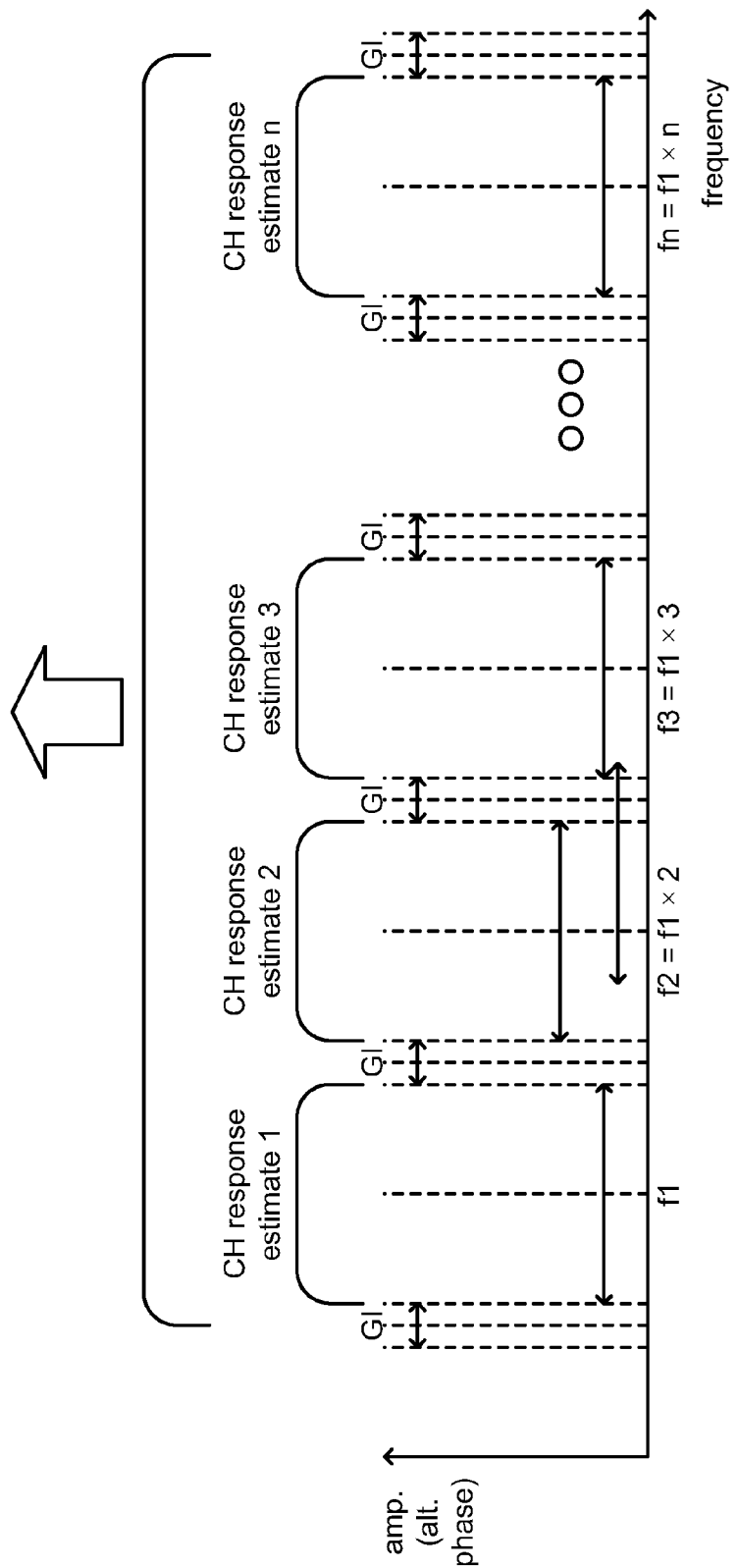

Referring to the embodiment 600 of FIG. 6, with respect to this diagram, a number of respective guard intervals (GIs) are implemented at the edges of the respective frequency bands. Such GIs may be viewed as occurring at the outer limits (e.g., lower and upper) of each respective frequency bands in an effort to ensure little or no interaction between the respective frequency bands. In accordance with the respective channel response estimates generated by such frequency bands separated by respective guard intervals, it may be understood that certain smoothing effects may be made and performed when splicing and combining together the different respective channel response estimates.

Figure 7:
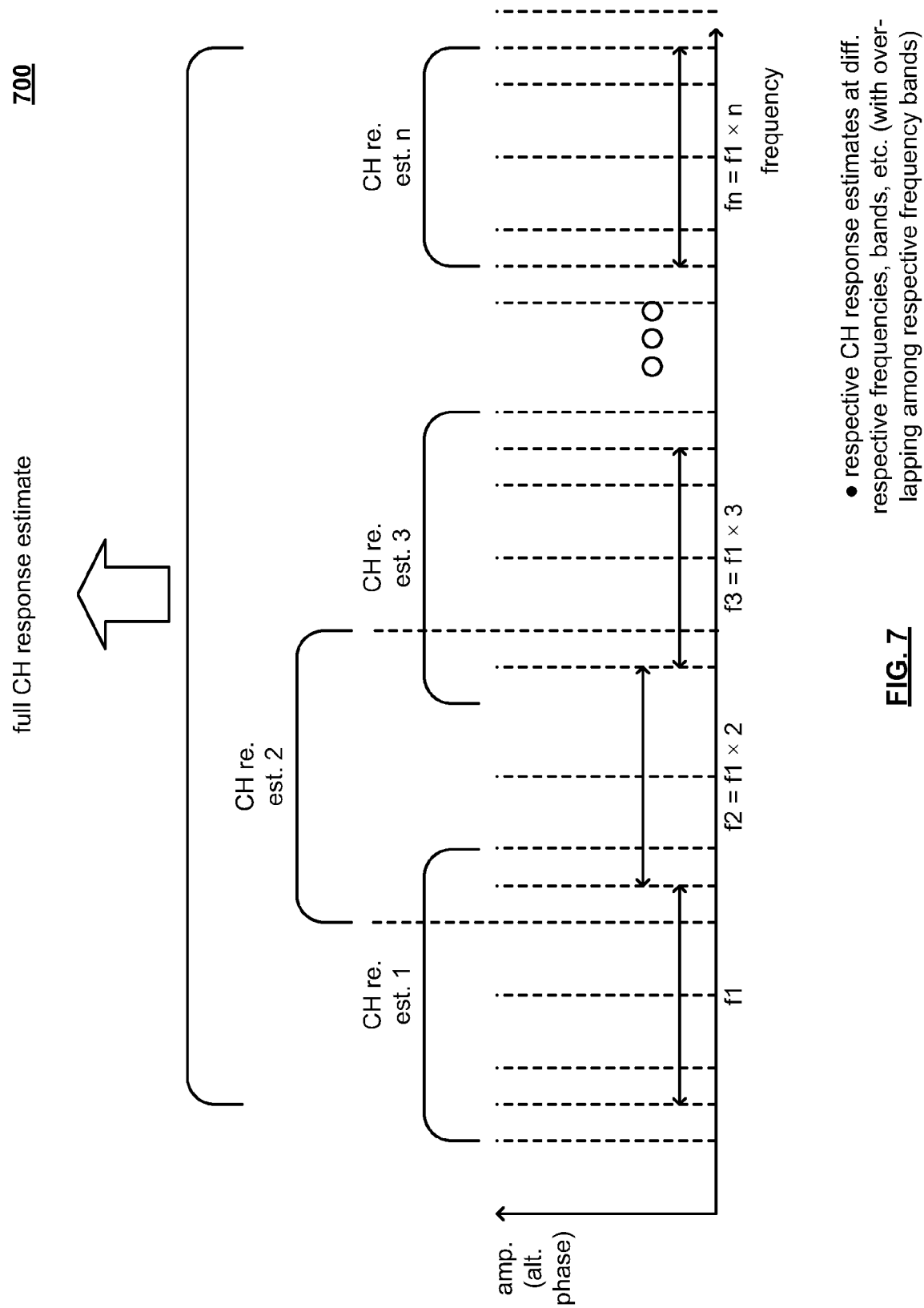

Referring to the embodiment 700 of FIG. 7, in this diagram, the various respective frequency bands have some overlap with one another. The respective channel response estimates associated with these respective frequency bands may provide a smoother transition and a more seamless combination of the respective channel response estimates in generating the full channel response estimate.

Figure 8:
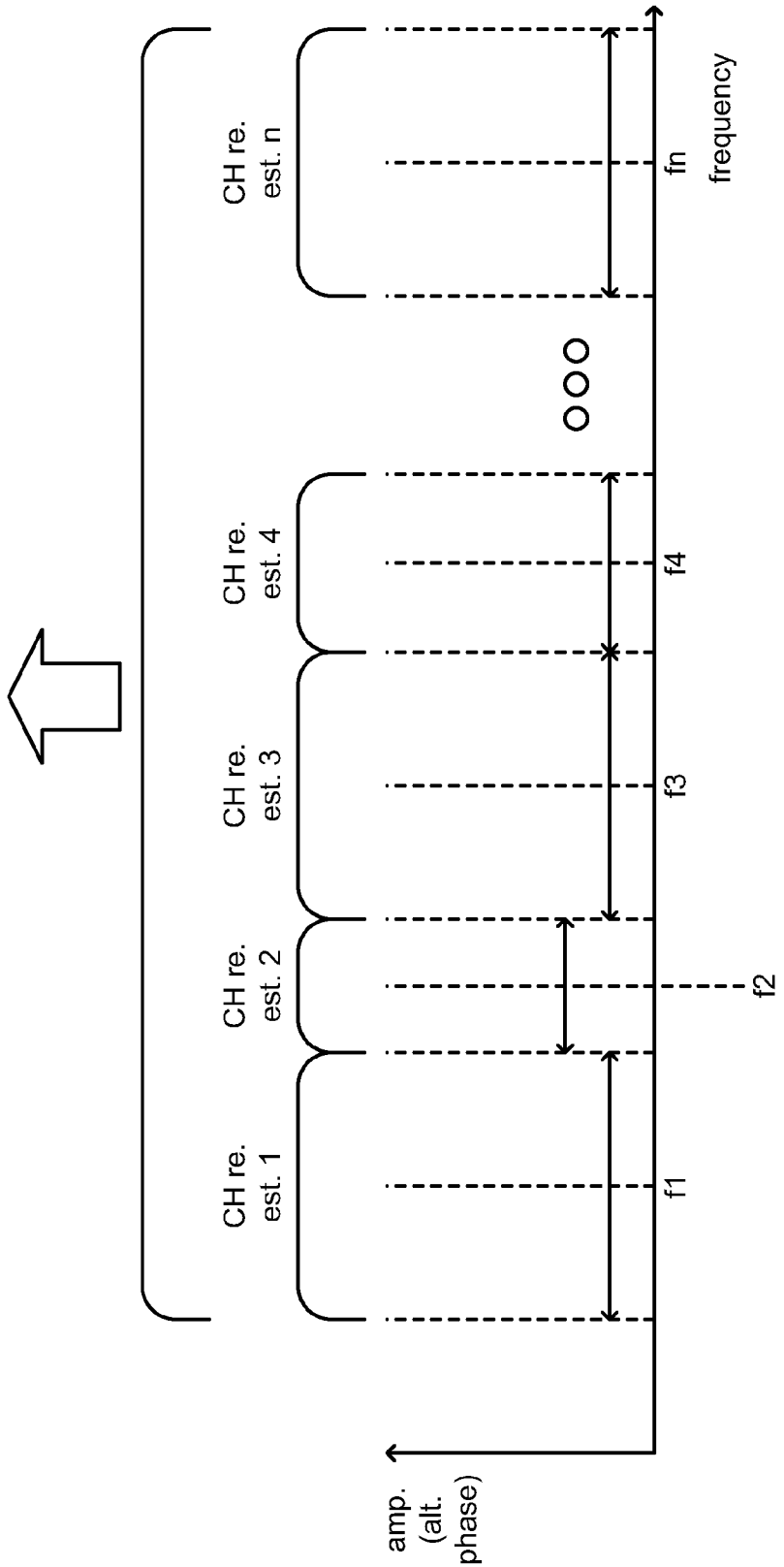

Referring to the embodiment 800 of FIG. 8, as may be seen with respect to this diagram, the frequency bands are of non-uniform width. Generally, any desired widths of respective frequency bands may be employed in accordance with generating different respective channel response estimates across a relatively wider portion of the frequency spectrum. For example, there may be some instances in which narrowband channels and relatively wider band channels are employed in combination with one another in a communication system.

Moreover, there may be some instances in which the center frequencies and/or frequency bandwidths of the various frequency bands may be modified over time, such as in accordance with a dynamic or adaptive implementation. Any desired partitioning of the frequency spectrum into different respective frequency bands having different respective center frequencies may be used in accordance with various aspects, and their equivalents, of the invention.

Figure 9:
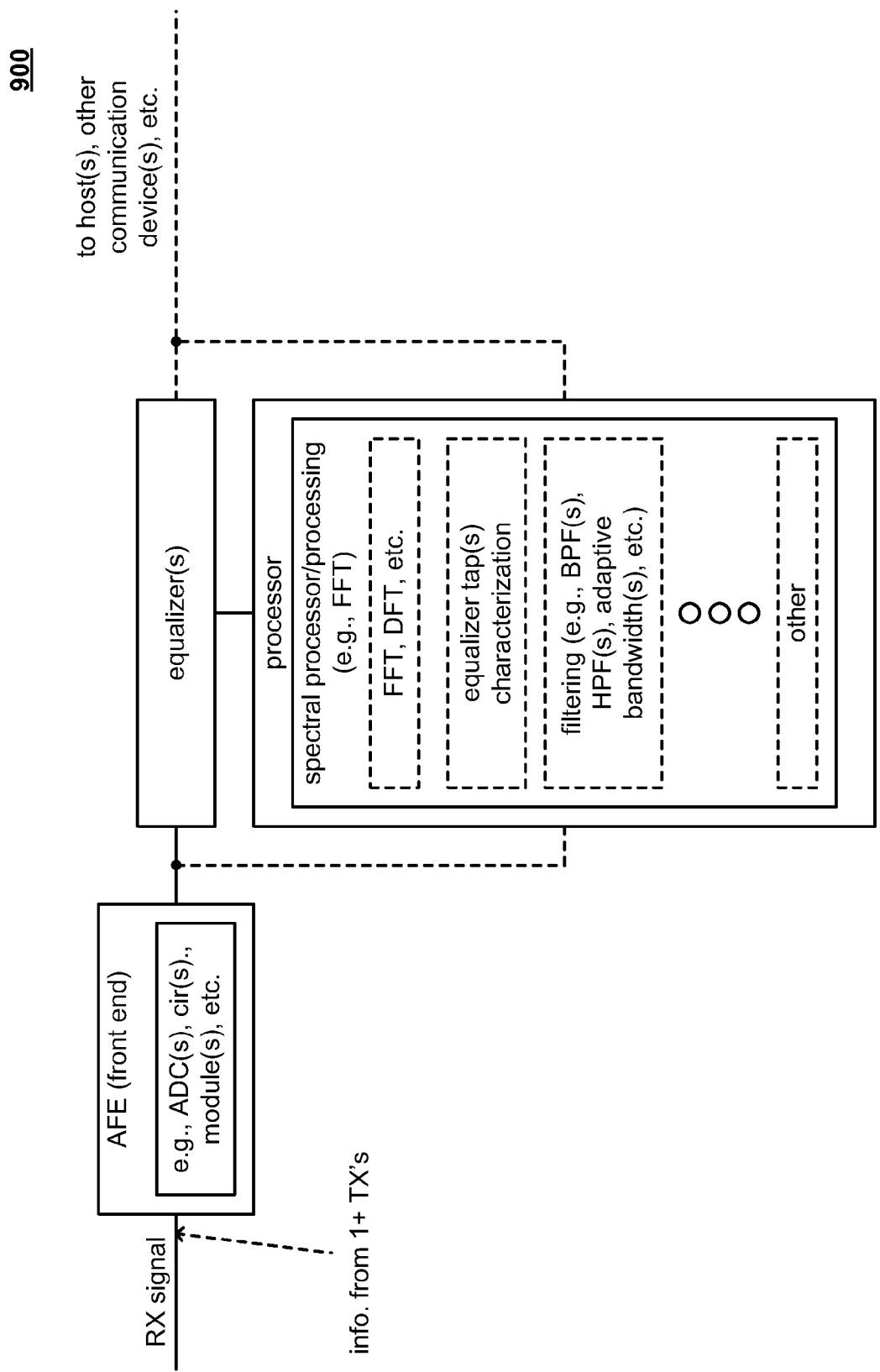
FIG. 9 illustrates an embodiment of a communication device.

FIG. 9 illustrates an embodiment 900 of a communication device. As shown within this diagram, a communication device receives a signal, such as from a communication link within a communication system or network, and the signal undergoes appropriate processing by and analog front end (AFE). Such an AFE may be of amended perform any of a number of operations including digital sampling, such as by an analog to digital converter (ADC), filtering (e.g., in the analog domain and/or the digital domain), frequency conversion (e.g., such as conversion from a carrier frequency down the baseband), scaling, gain adjustment, etc. Generally, such an AFE may be viewed as performing receipt and demodulation of a signal received from any communication link. Any of a number of perspective circuitries, modules, functional blocks, etc. may be implemented within various embodiments of an AFE.

It is also noted that such a communication device may receive information from one or more other communication devices (e.g., one or more transmitters) providing some indication regarding operation of one or more other communication devices within the communication system.

After the AFE, one or more processors (one processor shown within this embodiment) operate to perform spectral processing of the received signal that has undergone front and a processing by the AFE. For example, such a processor is implemented to perform spectral processing to generate different respective upstream channel response estimates corresponding to different respective sample sets that themselves correspond respectively to different respective center frequencies and/or frequency bands. These different respective upstream channel response estimates are then spliced or combined together to generate a full up stringent response estimate covering a relatively broader frequency range that each of the individual and respective center frequencies and/or frequency bands individually cover.

Any of a number of different types of signal processing may be performed including fast Fourier transform (FFT) processing, discrete Fourier transform (DFT) processing, etc. and/or any other form of signal processing including digital signal processing. For example, in alternative embodiments, various types of filtering, such as bandpass filtering, high pass filtering, etc. including those which may operate in accordance with having adaptive bandwidths (e.g., those being tunable two different bandwidths, different respective frequencies, etc.) may also be employed. In addition, such a processor may be implemented to perform filtering, and such filtering may be made in combination with analog filtering (e.g., such as may be performed within the AFE).

Figure 10:
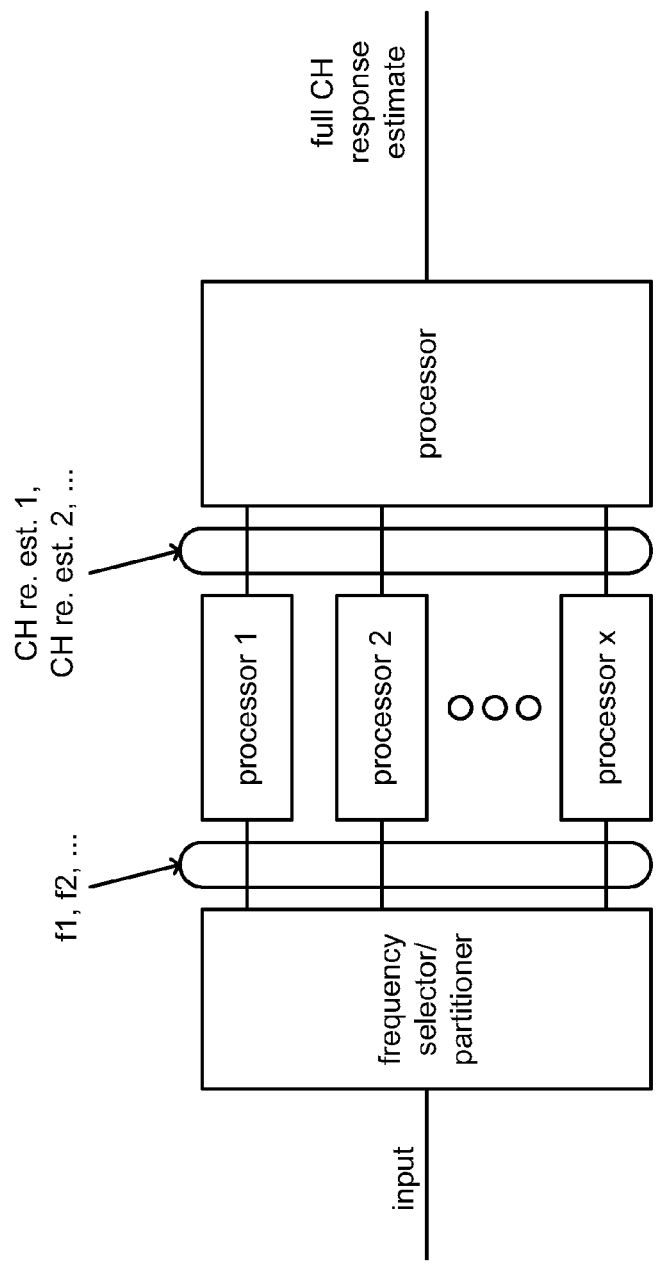
FIG. 10 illustrates an embodiment of a multiple devices, components, functional blocks, etc. employed for different respective center frequencies and/or frequency bands.

FIG. 10 illustrates an embodiment 1000 of a multiple devices, components, functional blocks, etc. employed for different respective center frequencies and/or frequency bands. As may be seen with respect to this diagram, a frequency selector or partition or is operative to provide different respective frequency bands to different respective devices (shown pictorially as processors in this diagram). For example, information and/or signal content associated with a first frequency, frequency band, or channel is provided to a first processor. Analogously, information and/or signal content associated with the second frenzy, frequency band, or channels provided to a second processor, and so on. Each of these separately implemented processors is implemented to generate a channel response estimate corresponding to that information and/or signal content portion received thereby. A subsequent processor operates to combine or splice each of these respective channel response estimates together to generate a full channel response estimate.

As may be understood, any of a number of different architectures and implementations may be made by which different portions of the frequency spectrum may undergo appropriate processing to generate respective channel response estimates corresponding to those different portions of the frequency spectrum such that they subsequently undergo splicing or combination to generate a full channel response estimate for a relatively broader frequency range than any of the individual, respective channel response estimates.

A novel approach is presented herein to measure the amplitude and group delay variation of the upstream cable plant within various frequency ranges e.g., 5-42 MHz, 5-65 MHz, 5-85 MHz, or wider. This can be done using equalizer taps, FFTs, or raw samples before the FFT.

Use of Equalizer Taps to Estimate Upstream Plant Response.

This is performed as follows. Simultaneously step a spare burst receiver and transmitter (such as cable modem or specialized probe such as a downstream monitor (DMON)) across the upstream band, using frequency steps of ¼, ½, or ¾ (or some other desired frequency step) the symbol rate, for example. CMAP scheduler should schedule quiet times in the appropriate channels as the probe signal (sent by probe and received by burst receiver) steps across the upstream band.

At each frequency, capture pre-equalizer (e.g., from a transmitter device or a first communication device [e.g., a transceiver] such as a cable modem) and post-equalizer taps (e.g., from a receiver device or a second communication device [e.g., a transceiver] such as a cable modem termination system (CMTS)), gain and timing offset after a long ranging burst. The existing DOCSIS ranging bursts contain a long training sequence with known QPSK data which is designed to be a good probe of the upstream channel, and which has a known, approximately flat frequency spectrum.

Splice information from all frequency steps together to produce full upstream response. Overlap may be used to allow seamless blending of the responses measured at different frequencies.

The information measured at each frequency step includes pre-equalizer taps from CM, post-equalizer taps converged in burst receiver, timing offset estimate from nominal as estimated by burst receiver, frequency offset estimate from nominal as estimated by burst receiver, and gain offset estimate from nominal as estimated by burst receiver.

The equalizer taps may be further processed to estimate the upstream channel response. In many cases, the channel response may be closely approximated by the inverse of the total equalizer response, where the total equalizer response includes the pre-equalizer taps, post-equalizer taps, and auxiliary information such as estimated timing offset.

There may be holes (inaccessible bands) in the resulting spectrum estimate where other services such as set-top boxes are transmitting. The missing pieces can be filed with zeros (or other predetermined or convenient data) to process them in accordance with assembling the spliced spectrum.

Use of direct spectrum calculation (such as FFT) to estimate upstream plant response This is performed as follows. Simultaneously step a spare burst receiver or other device capable of performing spectral analysis, and transmitter (such as cable modem or specialized probe such as DMON), across the upstream band, using frequency steps of ¼, ½, or ¾ the symbol rate, for example. At each frequency, the probe signal is transmitted up the cable plant and is received by the burst receiver. The ratio of the spectrum of the received signal, to the spectrum of the transmitted signal, gives the estimate of the upstream plant response. Smoothing (such as averaging over multiple spectra) may be used to reduce the effect of noise in this process.

Other means can also be envisioned to compute the upstream plant response. A continuous wave (CW) sine wave signal can be swept across the upstream. A chirp signal can be sent. Any form of wideband, or swept narrowband, stimulus and response can be used to measure the plant response.

This disclosure will concentrate on the example of using an upstream DOCSIS ranging signal as the stimulus. At each frequency, received samples are captured in the burst receiver during the long ranging burst. The existing DOCSIS ranging bursts contain a long training sequence with known QPSK data which is designed to be a good probe of the upstream channel, and which has a known, approximately flat frequency spectrum.

The scheduler should be configured to schedule quiet times (e.g., empty time division multiple access (TDMA) slots) in the appropriate channels as the probe signal (sent by probe and received by burst receiver) steps across the upstream band. If the probe signal and existing DOCSIS channels are the same bandwidth, at most two channels will require simultaneous quiet times. If the probe signal has a wider bandwidth than existing DOCSIS channels, more channels may require simultaneous quiet times.

For each captured segment (which may be of length 4096 samples, as an example), compute the spectrum, using, for example, an FFT (fast Fourier transform) or variations of a DFT (discrete Fourier transform) or variations of an FFT, such as a windowed FFT or a digital filter bank. [See, for example, Crochiere and Rabiner, "Multirate Digital Signal Processing", Prentice-Hall, 1983]. The term "FFT" is employed herein in its most general sense to include by reference any form of digital spectrum generation. More complex signal processing algorithms may be used as well to estimate the spectrum.

It may be advantageous to have the burst receiver capture the digital samples and either perform the FFT itself, or hand the samples to an external device to perform the FFT processing. In either case, the FFT results in a sequence of frequency-domain samples. In the example of a 4096-point, complex-input FFT, there are 4096 complex output samples from the FFT. In the example of a 4096-point, real-input FFT, there are 2048 unique complex output samples from the FFT.

The FFT output samples contain both amplitude and phase information. Both the amplitude and group-delay responses of the upstream cable plant may be determined. Since both amplitude and phase may be required, averaging of FFT power alone (without phase information) over many FFTs of the same signal band, as is typically done with spectrum analyzers, is in many cases not sufficient. In addition, certain embodiments may operate to average the group delay over many FFTs of the same signal band.

The averaging of the amplitude and group delay is done as follows. For each FFT taken, the real and imaginary parts (often called "I" and "Q", respectively) of each frequency domain sample are converted to amplitude (or magnitude) and phase. The amplitude squared ($I^2+Q^2$) is of interest since it represents the power in each bin, although other functions of the amplitude may also be used. The amplitude squared is averaged bin-by-bin over many (example 128) FFTs. The averaged FFTs may be independent, that is, based on disjoint blocks of input samples, or there may be overlap (such as 50%) between blocks. Windowing or filter-bank techniques may be applied in the time domain (ahead of the FFT) or in the frequency domain (after the FFT) or by any other standard means.

Similarly, the phase information in the output FFT samples is used to compute the group delay. The group delay is defined as:

group_delay=−d(phi)/d(omega)

where:

group_delay is the group delay in seconds phi is the phase in radians omega is the frequency in radians per second.

d( )means derivative or differential

The phase is thus processed according to the above equation to give the group delay.

The above derivative may be approximated by a simple first-order difference. The group delay is then averaged bin-by-bin over many (example 128) FFTs, in the same manner as the magnitude-squared is averaged. As before, the averaged FFTs may be independent, that is, based on disjoint blocks of input samples, or there may be overlap (such as 50%) between blocks.

The above FFT processing, including averaging, is done at a given center frequency. The center frequency is then incremented and the FFT processing is repeated.

Then, such information is spliced or combined together from all frequency steps to produce a full upstream plant frequency response.

Overlap is used to allow seamless blending of the responses measured at different frequencies. For example, assume that the FFT produces valid samples over a bandwidth equal to ¾ of the symbol rate. In some embodiments, the center frequency may be stepped by ½ the symbol rate, thus allowing for an overlap of ⅛ of the symbol rate at each side of the spectrum. In accordance with such splicing or combination together or two successive spectra, care may be taken to adjust blending parameters (for example, gain, offset, and tilt) so that the spectra agree (with minimum mean-squared error, for example) in the overlap region. In this way the individual narrowband spectra can be spliced together nearly seamlessly into an overall wideband spectrum.

The above processing was based on the assumption that the transmitted upstream probe signal is approximately flat over the FFT band of interest. This should be a good assumption for the DOCSIS ranging training signal. However, if the probe signal is not spectrally flat, then it may be determined that either its response is known or can be measured and calibrated. Then, the measured FFT is divided by the spectrum of the transmitted training sequence, to get the channel response. This calibration can be done using the complex FFT samples (including magnitude and phase) or just using the magnitude of the FFT samples.

Figure 11:
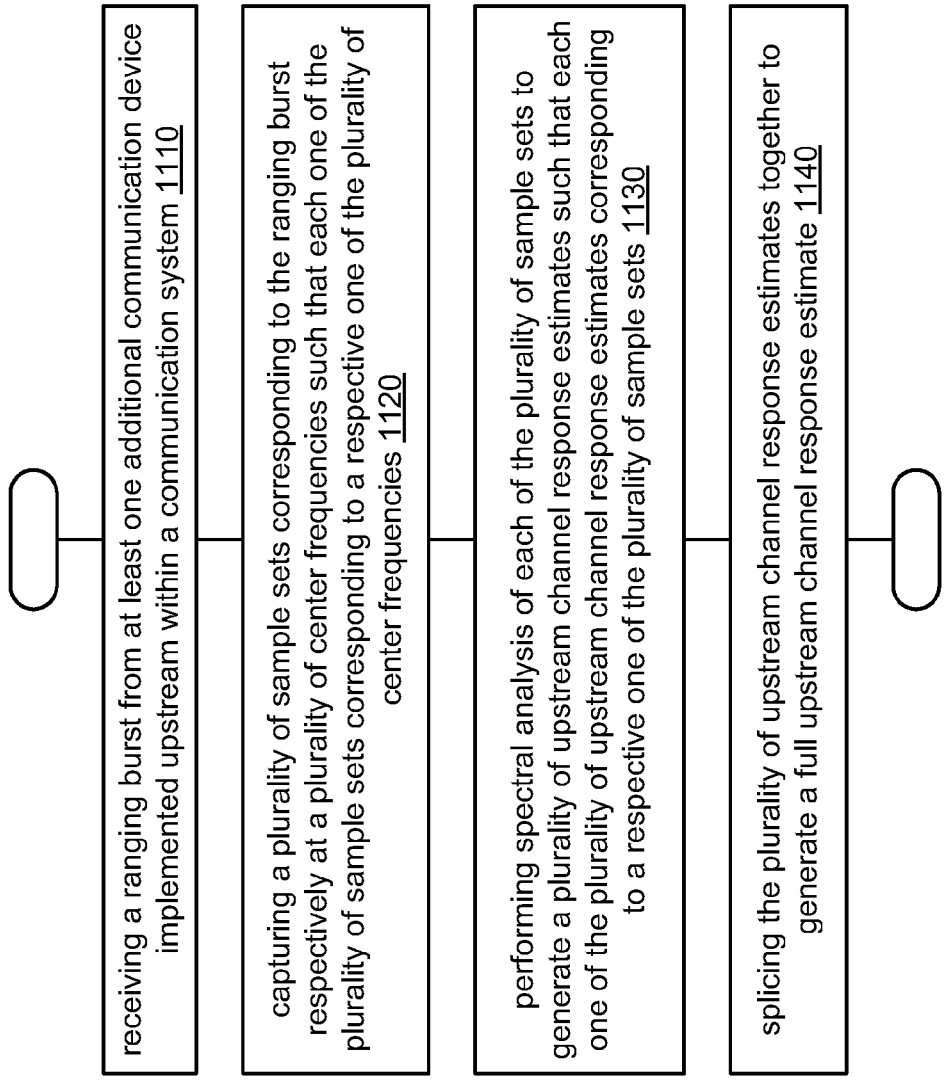
FIG. 11 illustrates an embodiment of a method for operating at least one communication device.

FIG. 11 illustrates an embodiment of a method 1100 for operating at least one communication device.

Referring to method 1100 of FIG. 11, the method 1100 begins by receiving a ranging burst from at least one additional communication device implemented upstream within a communication system, as shown in a block 1110. For example, if the method 1100 is viewed as being performed by a communication device, then a ranging burst is received after having been transmitted from at least one additional communication device.

The method 1100 continues by capturing a plurality of sample sets corresponding to the ranging burst respectively in a plurality of center frequencies such that each one of the plurality of sample sets corresponding to a respective one of the plurality of center frequencies, as shown in a block 1120. That is to say, a number of respective sample sets are captured, in each respective sample set corresponds to a different respective center frequency and/or frequency band.

The method 1100 then operates by performing spectral analysis of each of the plurality of sample sets to generate a plurality of upstream channel response estimates such that each one of the plurality of upstream channel response estimates corresponding to a respective one of the plurality of sample sets, as shown in a block 1130.

The method 1100 continues by splicing the plurality of upstream channel response estimates together to generate a full upstream channel response estimate, as shown in a block 1140.

Figure 12:
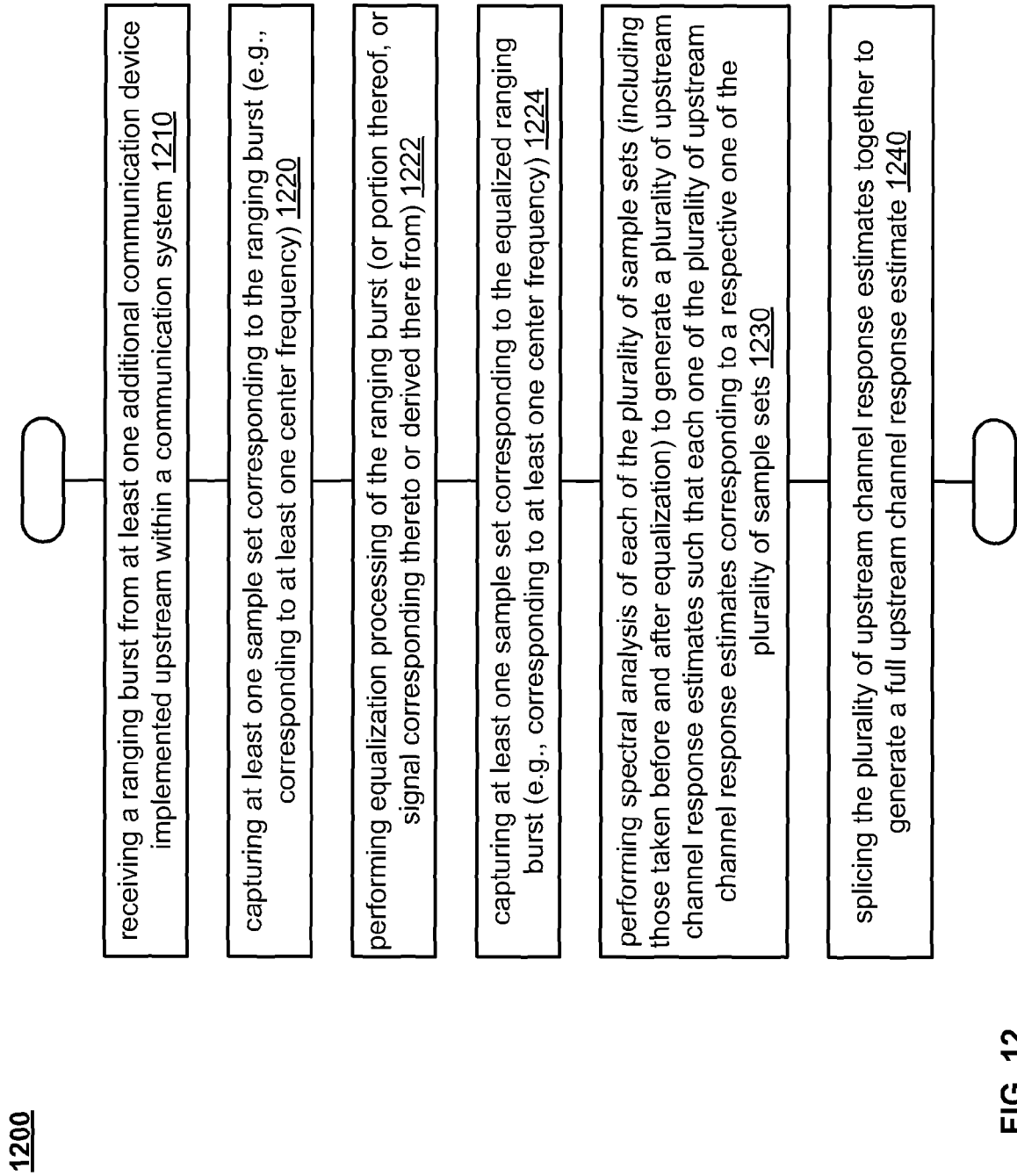
FIG. 12 illustrates an alternative embodiment of a method for operating at least one communication device.

FIG. 12 illustrates an alternative embodiment of a method 1200 for operating at least one communication device.

Referring to method 1200 of FIG. 12, the method 1200 begins by receiving a ranging burst from at least one additional communication device implemented upstream within a communication system, as shown in a block 1210. From certain perspectives, the method 1200 of this diagram may be viewed as been performed within the communication device including equalization capability (e.g., such a communication device may be implemented as including one or more equalizers).

The method 1200 continues capturing at least one sample set corresponding to the ranging burst (e.g., corresponding to at least one center frequency), as shown in a block 1220. The method 1200 then operates by performing equalization processing of the ranging burst (or portion thereof, or signal corresponding thereto or derived therefrom), as shown in a block 1222. The method 1200 continues by capturing at least one sample set corresponding to the equalized ranging burst (e.g., corresponding to at least one center frequency), as shown in a block 1224. As may be understood, the capturing of the at least one sample as shown within the block 1220 is made with respect to a signal that is not undergone equalization. After the signal has undergone equalization, subsequent capturing of at least one sample set is performed. Then, different respective sample sets are available with respect to at least one that has not undergone any equalization processing as well as at least one that has undergone equalization processing.

The method 1200 then operates by performing spectral analysis of each of the plurality of sample sets to generate a plurality of upstream channel response estimates such that each one of the plurality of upstream channel response estimates corresponding to respective one of the plurality of sample sets, as shown in a block 1230. Such spectral analysis is performed with respect to at least one sample set that has undergone a position processing in at least one sample set that has not undergone any equalization processing.

The method 1200 continues by splicing the plurality of upstream channel response estimates together to generate a full upstream channel response estimate, as shown in a block 1240.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 (or alternatively, when the magnitude of signal 2 is less than that of signal 1).

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, electrical, optical, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
a communication interface; and
a processor configured to:
  receive, via the communication interface, a ranging burst transmitted via a channel from another apparatus;
  capture a plurality of sample sets corresponding to the ranging burst, wherein each sample set of the plurality of sample sets corresponds to a respective center frequency of a plurality of center frequencies of a plurality of sub-channels distributed across the channel;
  perform fast Fourier transform (FFT) processing of each sample set of the plurality of sample sets to generate a plurality of channel response estimates, wherein each channel response estimate of the plurality of channel response estimates corresponds to a respective channel response estimate of a respective sub-channel of the plurality of sub-channels; and
  splice the plurality of channel response estimates together to generate a full channel response estimate of the channel.

2. The apparatus of claim 1, wherein the processor further comprising:
an equalizer configured to process the ranging burst, wherein:
at least one of the plurality of sample sets corresponds to the ranging burst captured before undergoing processing by the equalizer; and
at least one of the plurality of sample sets corresponds to the ranging burst captured after undergoing processing by the equalizer.

3. The apparatus of claim 1, wherein:
at least one of the plurality of sample sets corresponding to a plurality of gain offsets corresponds to the ranging burst; and
at least one of the plurality of sample sets corresponding to a plurality of timing offsets corresponds to the ranging burst.

4. The apparatus of claim 1, wherein the ranging burst includes a long training sequence having quadrature phase shift keying (QPSK) modulated data.

5. The apparatus of claim 1 further comprising:
a communication device that is operative within at least one of a satellite communication system, a wireless communication system, a wired communication system, a fiber-optic communication system, a mobile communication system, or a cable system.

6. An apparatus comprising:
a communication interface; and
a processor configured to:
capture a plurality of sample sets corresponding to a ranging burst that is received via the communication interface, wherein each sample set of the plurality of sample sets corresponds to a respective center frequency of a plurality of center frequencies of a plurality of sub-channels distributed across a channel;
perform spectral analysis of each sample set of the plurality of sample sets to generate a plurality of channel response estimates, wherein each channel response estimate of the plurality of channel response estimates corresponds to a respective channel response estimate of a respective sub-channel of the plurality of sub-channels; and
splice the plurality of channel response estimates together to generate a full channel response estimate of the channel.

7. The apparatus of claim 6, wherein the processor further comprising:
an equalizer to process the ranging burst, wherein:
at least one of the plurality of sample sets corresponds to the ranging burst captured before undergoing processing by the equalizer; and
at least one of the plurality of sample sets corresponds to the ranging burst captured after undergoing processing by the equalizer.

8. The apparatus of claim 6, wherein at least one of the plurality of sample sets corresponding to a plurality of gain offsets corresponds to the ranging burst.

9. The apparatus of claim 6, wherein at least one of the plurality of sample sets corresponding to a plurality of timing offsets corresponds to the ranging burst.

10. The apparatus of claim 6, wherein the ranging burst includes a long training sequence having quadrature phase shift keying (QPSK) modulated data.

11. The apparatus of claim 6, wherein the processor is further configured to:
perform fast Fourier transform (FFT) processing of each sample set of the plurality of sample sets to generate the plurality of channel response estimates.

12. The apparatus of claim 6, wherein the plurality of center frequencies are uniformly spaced apart in frequency across the channel, wherein a first of the plurality of center frequencies is separated from a second of the plurality of center frequencies by a frequency increment and the second of the plurality of center frequencies is separated from a third of the plurality of center frequencies by the frequency increment.

13. The apparatus of claim 6 further comprising:
a communication device that is operative within at least one of a satellite communication system, a wireless communication system, a wired communication system, a fiber-optic communication system, a mobile communication system, or a cable system.

14. A method for execution by a communication device, the method comprising:
via an input of the communication device, receiving a ranging burst from another communication device;
capturing a plurality of sample sets corresponding to the ranging burst, wherein each sample set of the plurality of sample sets corresponds to a respective center frequency of a plurality of center frequencies of a plurality of sub-channels distributed across a channel;
performing spectral analysis of each sample set of the plurality of sample sets to generate a plurality of channel response estimates, wherein each channel response estimate of the plurality of upstream channel response estimates corresponds to a respective channel response estimate of a respective sub-channel of the plurality of sub-channels; and
splicing the plurality of channel response estimates together to generate a full channel response estimate of the channel.

15. The method of claim 14 further comprising:
operating an equalizer of the communication device to process the ranging burst;
capturing at least one of the plurality of sample sets corresponding to the ranging burst before the ranging burst undergoing processing by the equalizer; and
capturing at least one of the plurality of sample sets corresponding to the ranging burst after the ranging burst undergoing processing by the equalizer.

16. The method of claim 14, wherein:
at least one of the plurality of sample sets corresponds to a plurality of gain offsets corresponding to the ranging burst; and
at least one of the plurality of sample sets corresponds to a plurality of timing offsets corresponding to the ranging burst.

17. The method of claim 14, wherein the ranging burst includes a long training sequence having quadrature phase shift keying (QPSK) modulated data.

18. The method of claim 14 further comprising:
performing fast Fourier transform (FFT) processing of each sample set of the plurality of sample sets to generate the plurality of channel response estimates.

19. The method of claim 14, wherein the plurality of center frequencies are uniformly spaced apart in frequency across the channel, wherein a first of the plurality of center frequencies is separated from a second of the plurality of center frequencies by a frequency increment and the second of the plurality of center frequencies is separated from a third of the plurality of center frequencies by the frequency increment.

20. The method of claim 14, wherein: the communication device is operative within at least one of a satellite communication system, a wireless communication system, a wired communication system, a fiber-optic communication system, a mobile communication system, or a cable system.

\* \* \* \* \*